United States Patent [19]

Kaneko

[11] Patent Number: 5,018,179
[45] Date of Patent: May 21, 1991

[54] RECURSIVE FILTER AND IMAGE DISPLAY APPARATUS INCLUDING THE SAME

[75] Inventor: Makoto Kaneko, Tochigi, Japan
[73] Assignee: Kabushiki Kaisha Toshiba, Kawasaki, Japan
[21] Appl. No.: 509,737
[22] Filed: Apr. 17, 1990

[30] Foreign Application Priority Data

Apr. 18, 1989 [JP] Japan .................................. 1-096229

[51] Int. Cl.$^5$ ...................... H05G 1/64; H04N 5/213; H04N 5/32
[52] U.S. Cl. .................................... 378/99; 358/111; 358/105; 358/167
[58] Field of Search ............................. 378/99, 98, 62; 358/111, 36, 167, 105

[56] References Cited

U.S. PATENT DOCUMENTS

| | | | |
|---|---|---|---|
| 4,639,784 | 1/1987 | Fling | 358/105 |
| 4,646,153 | 2/1987 | Fukuda et al. | 358/167 |
| 4,663,773 | 5/1987 | Haendle et al. | 358/111 |
| 4,677,478 | 6/1987 | Kruger et al. | 358/111 |
| 4,679,086 | 7/1987 | May | 358/105 |
| 4,816,681 | 3/1989 | Shimura | 358/111 |
| 4,860,104 | 8/1989 | Katsuyama | 358/167 |
| 4,954,894 | 9/1990 | Kitaura | 358/167 |

FOREIGN PATENT DOCUMENTS 63-55400 4/1988 Japan .

Primary Examiner—Edward P. Westin
Assistant Examiner—Kim-Kwok Chu
Attorney, Agent, or Firm—Finnegan, Henderson, Farabow, Garrett, and Dunner

[57] ABSTRACT

A recursive filter for reducing image noise, in which a subtracter calculates a subtraction between first and second images to obtain a subtraction result, and a factor table determines an addition ratio between the first and second images on the basis of the subtraction result, and in which an adder adds the first and second images at the addition ratio to obtain a third image. An image display apparatus including the recursive filter is also disclosed.

19 Claims, 5 Drawing Sheets

RECURSIVE FILTER AND IMAGE DISPLAY APPARATUS INCLUDING THE SAME

BACKGROUND OF THE INVENTION

1. Field of the Invention

The present invention relates to a recursive filter for use in reducing image noise in an image display technique and an image display apparatus having the recursive filter.

2. Description of the Background Art

In a conventional image display apparatus such as an X-ray apparatus where an X-ray is irradiated to an object to display an objection profile of a moving image of the object on a monitor, a recursive filter for reducing image noise is used by taking advantage of the afterimage effect.

However, when a large motion part of an object is processed by using a recursive filter, the afterimage effect largely affects to reduce image contrast, and an artifact is produced to bring about a deteioration of the image quality. In order to solve such a problem, a conventional recursive filter has been proposed, as disclosed in Japanese Utility Model Laid-Open specification No. 63-55400.

In FIG. 1, there is shown a conventional recursive filter for use in an image display apparatus. An analog video signal output by an image intensifier (I.I.) (not shown) is fed to an A/D (analog-digital) converter 1 where the analog video signal is converted into a first digital video signal. Then, the first digital video signal is sent from the A/D converter 1 to a frame memory 4 through a selector 6 having a switch therein and is once stored in the frame memory 4. The digital video signal (hereinafter referred to as the second digital video signal) read out of the frame memory 4 is then fed to a D/A (digital-angalog) converter 8 where the second digital video signal is converted into an analog video signal, and the analog video signal is fed to a monitor for displaying an image thereon. The first digital video signal also sent from the A/D converter 1 to a comparator 7 in which the first digital video signal is compared with the second digital video signal read out of the frame memory 4 every corresponding pixel.

For example, when a difference between the first and second digital video signals is larger than a certain threshold value, the comparator 7 changes over the switch from the terminal A to the terminal B in the selector 6. Hence, the first digital video signal is passed to the frame memory 4 through the selector 6 and is stored in the frame memory 4 and is fed to the monitor to display the image thereon as well.

In turn, when the difference between the first and second digital video signals is smaller than the threshold value, the switch of th selector 6 is changed over from the terminal B to the terminal A by the comparator 7. Then, the first digital video signal is fed from the A/D converter 1 to a multiplier 2 where the first digital video signal is multiplied by a constant K (0 to 1), and the first digital video signal multiplied by K is sent to an adder 3. In another multiplier 5, the second digital video signal fed from the frame memory 4 is multiplied by another constant (1-K), and the second digital video signal multiplied by (1-K) is also sent to the adder 3. In the adder 3, the two digital video signals are added to obtain a new digital video signal as new image data which is fed to the frame memory 4 and is once stored therein and is also fed to the monitor to display the image thereon as well. This processs is carried out every corresponding pixel.

In the conventional recursive filter, the improvement can be performed in reducing the image noise. However, whether or not the recursive filter process is carried out is determined by the threshold value, and an unnatural feeling remains around the threshold value. Hence, the variation around the threshold value is not properly reproduced on the display, and the variation is not smooth around the threshold value.

Further, in the conventional recursive filter, it is difficult to determine the threshold value. That is, when the threshold value is too small, the image noise is apt to be produced, and, in turn, when the threshold value is too large, the image contrast is reduced, and the artifact is produced.

SUMMARY OF THE INVENTION

Accordingly, it is an object of the present invention to provide a recursive filter, free from the aforementioned defects and disadvantages of the prior art, which is capable of reducing image noise and preventing reduction of image contrast to prevent an artifact, thereby reproducing a natural image.

It is another object of the present invention to provide an image display apparatus including a recursive filter, free from the aforementioned defects and disadvantages of the prior art, which is capable of reducing image noise and preventing reduction of image contrast to prevent an artifact, thereby reproducing a natural image.

In accordance with one aspect of the present invention, there is provided a recursive filter for reducing image noise, comprising subtracter means for calculating a subtraction between firs and second images to obtain a subtraction result, a factor table for determining an addition ratio between the first and second images on the basis of the subtraction result, and adder means for adding the first and second images at the addition ratio to obtain a third image.

In accordance with another aspect of the present invention, there is provided an image display apparatus, comprising pickup means for picking up an analog image signal from an object, a recursive filter for reducing image noise, an analog-digital converter for converting the analog image signal into a digital image signal to be sent to the recursive filter, a digital-analog converter for converting a digital image signal output by the recursive filter into another analog image signal, and a monitor for displaying an image thereon on the basis of the analog image signal fed from the digital-analog converter, the recursive filter including subtracter means for calculating a subtraction between first and second digital image signals to obtain a subtraction result, a factor table for determining an addition ration between the first and second digital image signals on the basis of the subtraction result, and adder means for adding the first and second digital image signals at the addition ratio to obtain a third digital image signal.

BRIEF DESCRIPTION OF THE DRAWINGS

These and other objects, features and advantages of the present invention will more fully appear from the following description of the preferred embodiments with reference to the accompanying drawings, in which.

DESCRIPTION OF TH PREFERRED EMBODIMENTS

Figure 2:
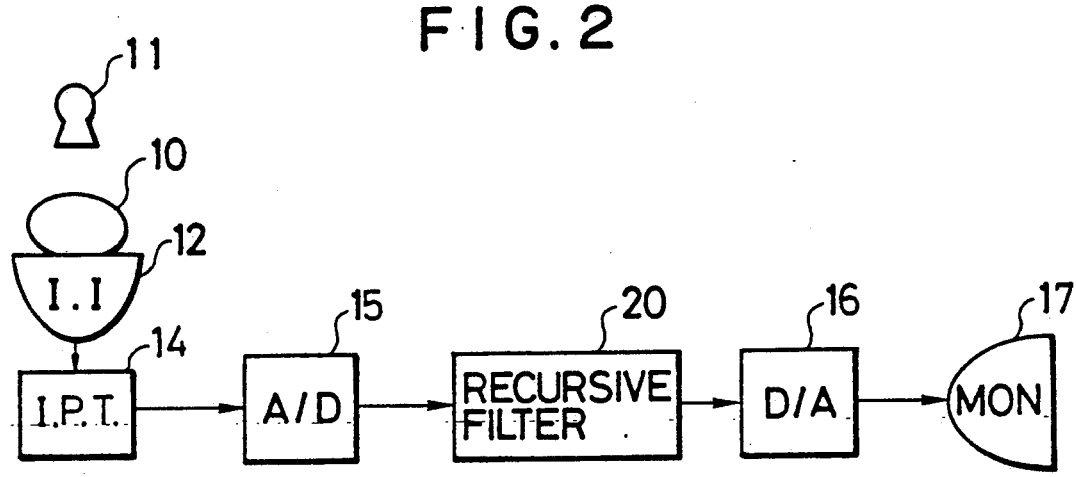
FIG. 2 is a block diagram of animage display apparatus including a recursive filter according to the present invention.

Referring now to the drawings, wherein like reference characters designated like or corresponding components throughout the several views and thus the repeated description can be omitted for the brevity, there is shown in FIG. 2 an image display apparatus such as an X-ray apparatus including a recursive filter according to the present invention.

Figure 1:
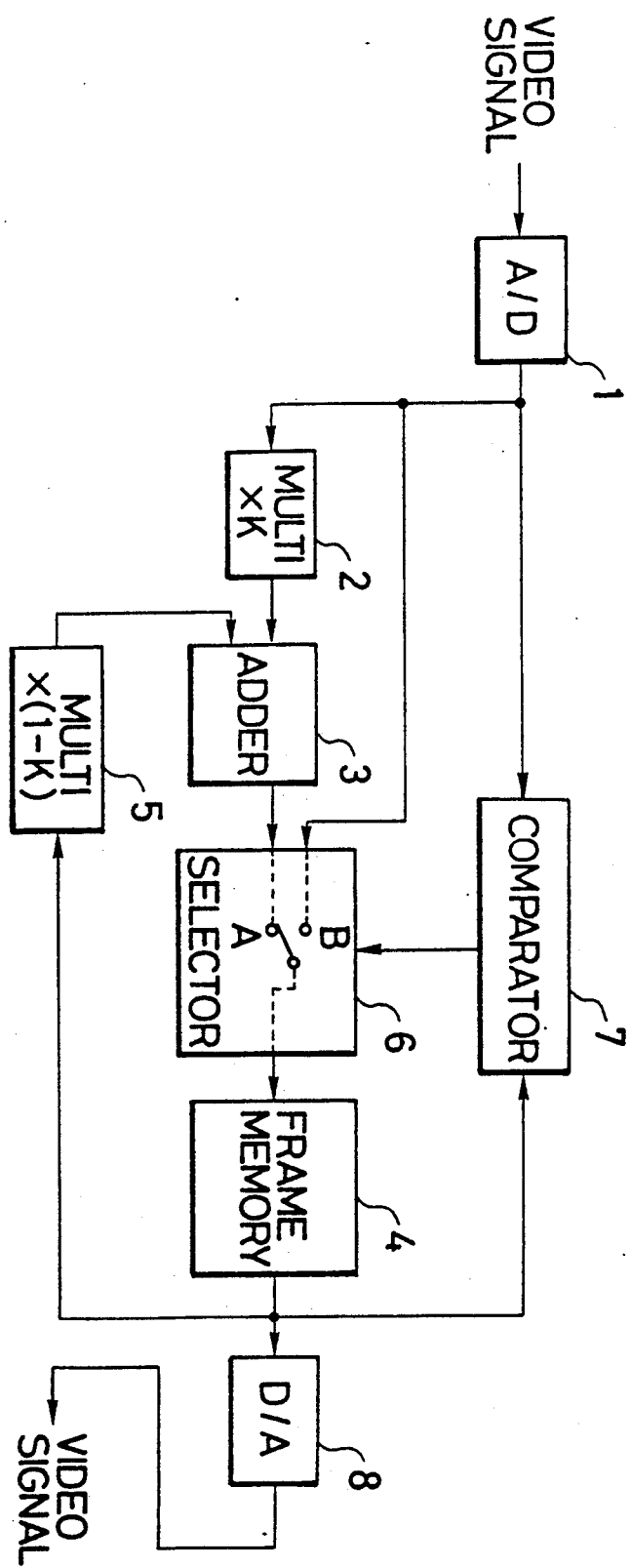
FIG. 1 is a block diagram of a conventional recursive filter for use in an image display apparatus.

As shown in FIG. 1, in the image display apparatus, an X-ray tube 11 irradiates X-ray to an object 10 such as a patient, and an image intensifier (I.I.) 12 receives the X-ray through the object 10 and converts the received X-ray into light beam. The light beam is then passed through an image pickup tube (I.P.T.) 14 to obtain an analog signal. The analog signal is fed to an analog-digital (A/D) converter 15 for converting the analog signal into a digital signal. The obtained digital signal is sent to a recursive filter 20 for reducing image noise by taking advantage of the afterimage effect and is processed in the recursive filter 20, as hereinafter described in detail. The digital signal output from the recursive filter 20 is fed to a digital-analog (D/A) converter 16 for converting the digital signal into the analog signal, and the obtained analog signal is sent to a monitor (MON) 17 for displaying an image thereon.

Figure 3:
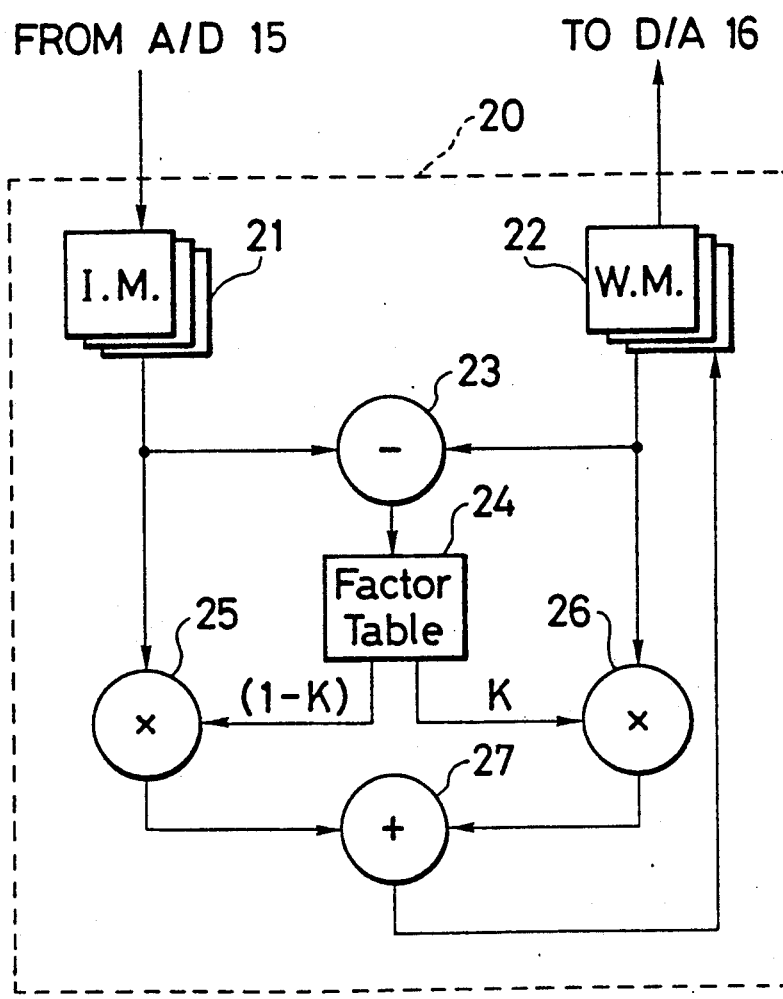
FIG. 3 is a schematic view of a first embodiment of a recursive filter according to the present invention.

In FIG. 3, there is shown the first embodiment of the recursive filter 20 according to the present invention. The recursive filter 20 includes an image memory (I.M.) 21, a working memory (W.M.) 22, a subtracter 23, a factor table 24, two multipliers 25 and 26 and an adder 27, as described in detail hereinafter. The processing in the recursive filter 20 is carried out every corresponding pixel independently. In this embodiment, in fact, a plurality of image and working memories 21 and 22 are so provided that a plurality of signals or images are processed at the same time. For the convenience the digital signals stored in the respective image and working memories 21 and 22 are hereinafter referred to as "the original image" and "the filtered image".

Assuming that the original and filtered images are stored in the image and working memories 21 and 22, respectively, the original image read out of the image memory 21 is sent to the subtracter 23 in which the subtraction between the original an dfiltered images is carried out to obtain a subtraction result, i.e., a variation amount of a pixel or a pixel value. The obtained subtraction result or the pixel value is fed to the factor table 24 where, for instance, a constant K(0 to 1) is determined corresponding to an absolute value of the subtraction result or the pixel value according to a line a shown in FIG. 4. The factor table 24 outputs the constant K to the multiplier 26 and another constant (1-K) to the multiplier 25. Hence, the original image is multiplied by the constant (1-K) in the multiplier 25, and the filtered image is multiplied by the constant K in the multiplier 26. The multiplied original image and the multiplied filtered image are fed to the adder 27 where the two multiplied images are added to obtain a new filtered image, and the new filtered image is stored in the working memory 22 and is also sent to the monitor 17 via the D/A converter 16 to display the image on the monitor 17. This process is repeated.

Figure 4:
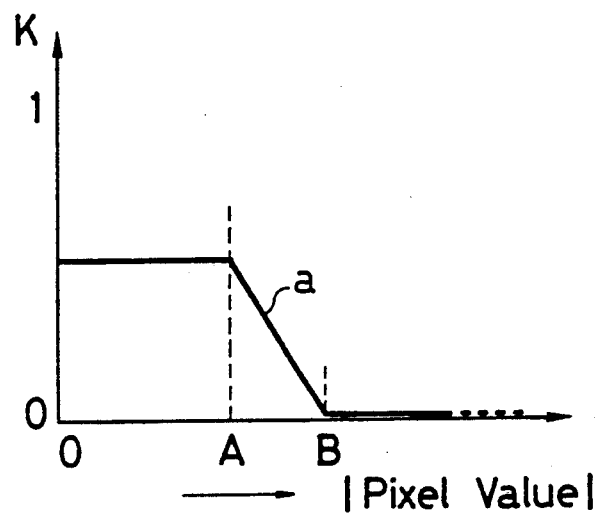
FIG. 4 is a graphical representation of one embodiment of a factor table for use in a recursive filter according to the present invention.

In the factor table shown in FIG. 4, when the pixel value is less than a value A, the constant K is 0.5, and the original and filtered images are synthesized at the ratio of 0.5 to 0.5, and the obtained new filtered image is reproduced on the monitor 17. When the pixel value is larger that a value B, the constant K is zero, and the filtered image is not synthesized. That is, the original image is output as it it from the recursive filter 20. When the pixel value is come in a range between the values A and B, the constant K is gradually reduced from 0.5 to zero. This means that the influence of the filtered image is gradually weakened depending on the variation amount of pixel or the pixel value.

In this embodiment, as described above, the image noise is largely and effectively reduced, and the decrease of the image contrast is effectively avoided to prevent the artifact, thereby reproducing a natural image without causing any lack between the large and small variation portions. Further, it is unnecessary to strictly determine the factor table. For example, when the pixel value for preventing the image noise to the minimum extent is determined to the point B in FIG. 4, the image noise is prevented and the image contrast can be obtained as far as possible. In such a case, even when the factor table is varied by changing theposition of the point A, no remarkable defect may appear in the reproduction image. Hence, the point A can be somewhat flexibly determined.

Figure 5:
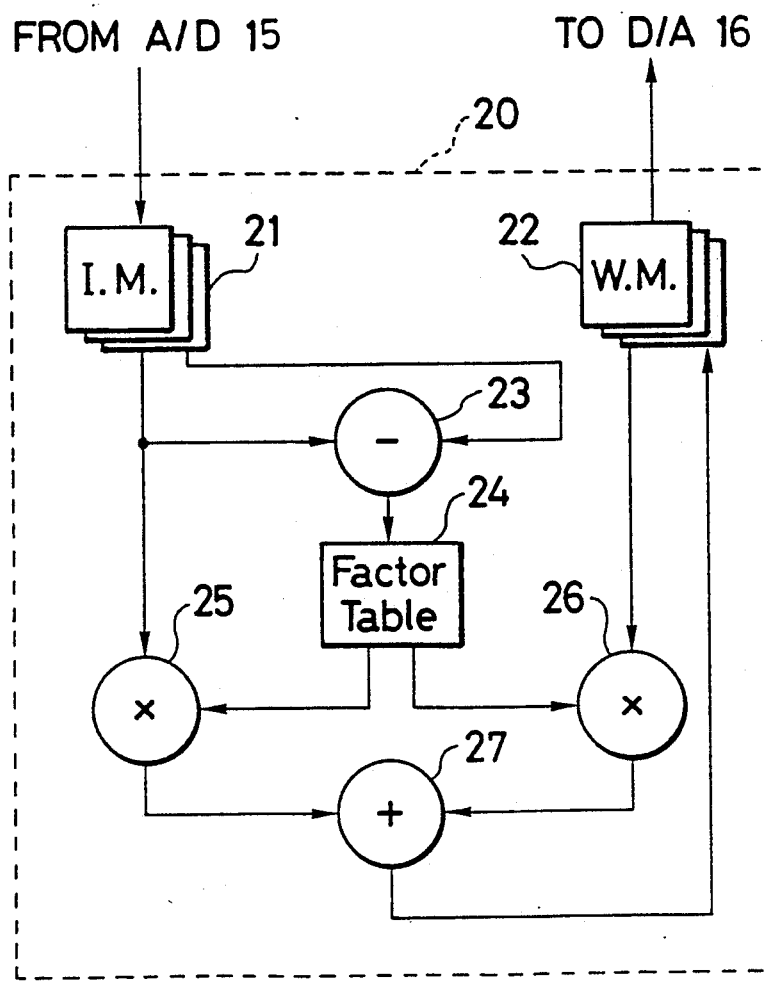
FIG. 5 is a schematic view of a second embodiment of a recursive filter according to the present invention.

In FIG. 5, there is shown the second embodiment of the recursive filter according to the present invention, having the same structure as the first embodiment shown in FIG. 3, except that the original images at the different times are input ot the subtracter 23. In this embodiment, since the motion of the object is exactly measured, the effect can be large in the image contrast.

Figure 6:
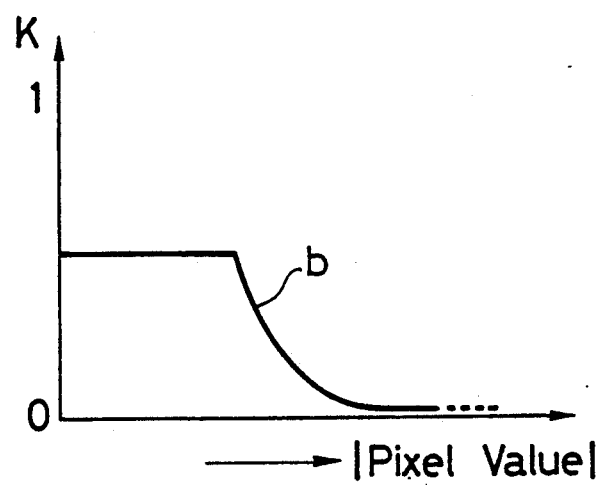
FIGS. 6 and 7 are graphical representations of other embodiments of a factor table for use in a recursive filter according to the present invention.
Figure 7:
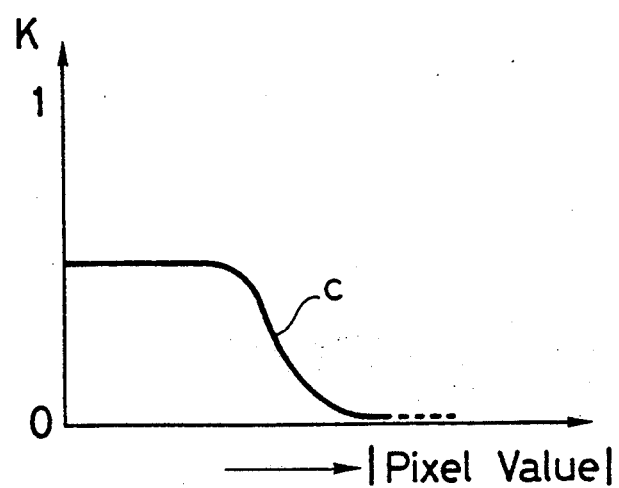

According to the present invention, instead of the factor table shown in FIG. 4, other factor tables can be used with the same effects and advantages, as shown in FIGS. 6 and 7. In FIG. 6, a line b is curved in two-dimensional near the upper threshold value so that the influence of the filter is more gradually reduced near the upper threshold value so as to smoothly connect at the upper threshold value of the pixel value, thereby removing the unnatural feeling around the upper threshold value. In FIG. 7, a line c is curved in two-dimensional near both the lower and upper threshold values so that the influence of the filter is more gradually reduced near the lower and upper threshold values so as to smoothly connect at the lower and upper threshold values of the pixel value, thereby removing the unnatural feeling around the lower and upper threshold values. Furthermore, a variety of factor tables can be possible. Therefore, by providing with an input device for the factor table, which is operable by an operator, a part of the displayed image can be emphasized, for instance, the image contrast is increased or decreased, to make good use for a diagnosis.

Figure 8:
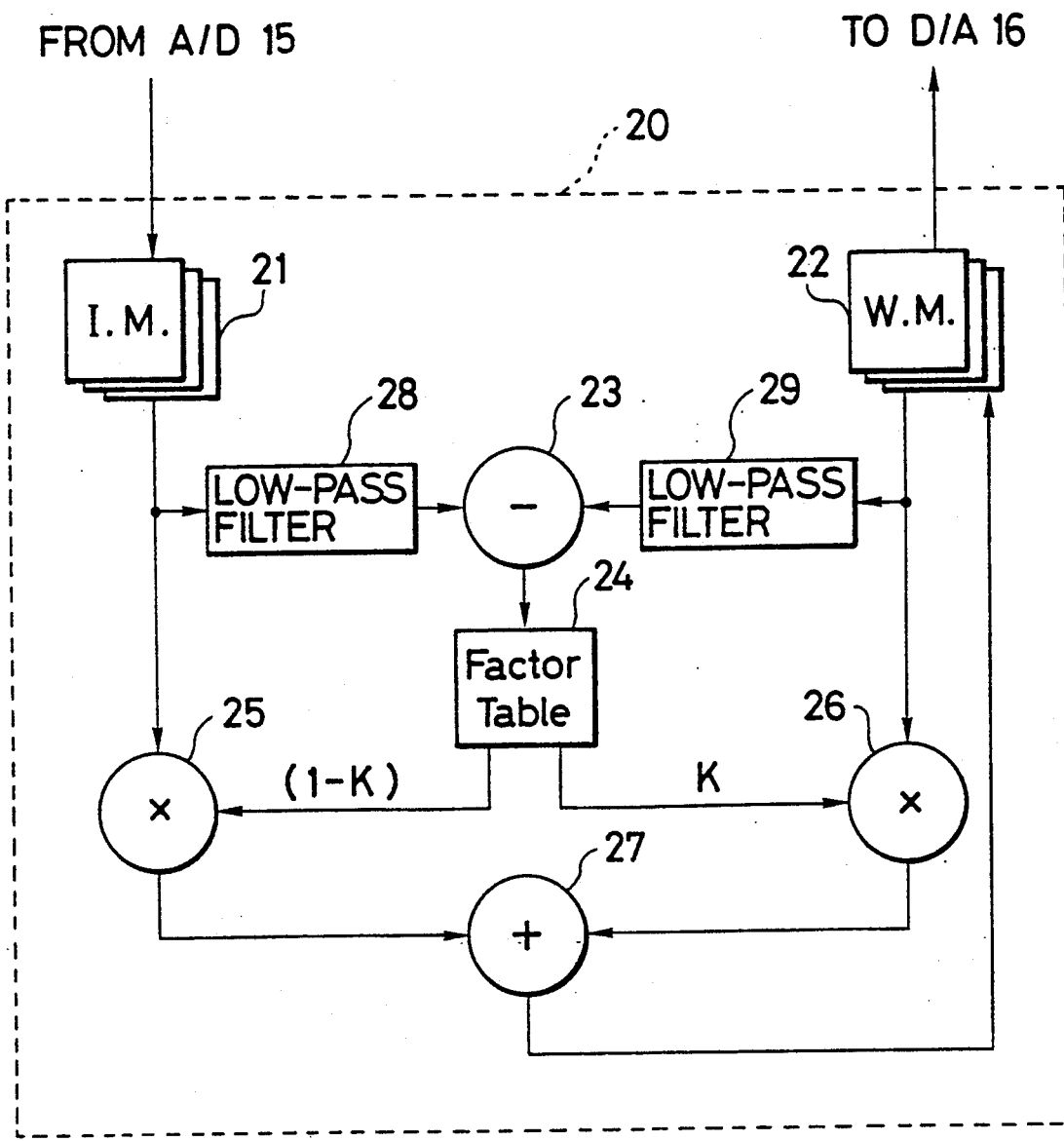
FIG. 8 is a schematic view of a third embodiment of a recursive filter according to the present invention.

In FIG. 8, there is shown the third embodiment of the recursive filter according to the present invention, having the same structure as the first embodiment shown in FIG. 3, except that two low-pass filters 28 and 29 are arranged between the image and working memories 21 and 22 and the subtracter 23 in order to discriminate whether the subtraction result between the original and filtered images is obtained by the image noise or the image motion. In this case, the original and filtered images are fed from the image and working memories 21 and 22 to the subtracter 23 through the respective low-pass filters 28 and 29. Hence, by passing the original and filtered images through the respective low-pass filters 28 and 29, the smoothing is carried out to reduce the noise component. In this embodiment, the subtraction result strongly reflects the motion of the image as compared with the conventional recursive filter. The low-pass frequency range of the low-pass filters can be varied with different effects.

Although the preferred embodiments of the present inventions have been described in connection with the X-ray apparatus as the image display apparatus, however, other image display apparatuses displaying an image as a moving image can be applicable in the same manner as described above.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A recursive filter for reducing image noise, comprising:
   subtracter means for claculating a subtraction between first and second images to obtain a subtraction result;
   a factor table for determining an addition ratio between the first and second images on the basis of the subtraction result; and
   adder means for adding the first and second images at the addition reatio to obtain a third inage 2. The filter of claim 1, also including first and second multiplier means, wherein the factor table determines first and second factors to be sent to the first and second multiplier means where the first and second images are multiplied by the first and second factors, respectively, to output multiplied results instead of the first and second images to the adder means.

3. The filter of claim 2, also including first and second memory means for once storing the first and second images, respectively.

4. The filter of claim 3, also including a third memory means for storing the third image.

5. The filter of claim 3, wherein the third image is stored in the second memory means to replace the second imagae with the third image.

6. The filter of dlaim 3, wherein the first and second memory means each include a plurality of memories.

7. The filter of claim 4, wherein the third memory means includes a plurality of memories.

8. The filter of claim 1, also including first and second low-pass filter so arrandged prior to the subtracter means that the first and second images are fed to the subtracter means through the respective first and second low-pass filters.

9. The filter of dlaim 2, wherein the first and second factors are (1-K) and K, respectively, wherein K is 0 to 1.

10. An image display aggaratus, comprising:
    pickup means for picking up an analog image signal from an object;
    a recursive filter for reducing image noise;
    an analog-digital converter for converting the analog image signal into a digital image signal to be sent to the recursive filter;
    a digital-analog converter for converting a digital image signal output by the recursive filter into another analog image signal; and
    a monitor for displaying an image thereon on the basis of the analog image signal fed from the digital-analog converter,
    the recursive filter including:
    subtracter means for calculating a subtraction between first and second digital image signals to obtain in subtraction result;
    a factor table for determining an addition ratio between the first and second digital image signals on the basis of the subtraction result; and
    adder means for adding the first and second digital image signals at the addition ratio to obtain a third digital image signal.

11. The apparatus of claim 10, also including first and second multiplier means, wherein the factor table determines first and second factors to be sent to the first and second multiplier means where the first and second digial image signals are multiplied by the first and second factors, respectively, to output multiplied results instead of the first and second digital image signals to the adder means.

12. The apparatus of claim 11, also including first and second memory means for once storing the first and second digital image signals, respectively.

13. The apparatus of claim 12, also including the third memory means for storing the third digital image signal.

14. The apparatus of claim 12, wherein the third digital image signal is stored in the second memory means to replace the second digital image signal with the third digital image signal.

15. The apparatus of claim 12, wherein the first and second memory means each include a plurality of memories.

16. The apparatus of claim 13, wherein the third memory means includes a plurality of memories.

17. The apparatus to claim 10, also including first and second low-pass filters so arranged prior to the subtracter means that the first and second digital image signals are fed to the subtracter means through the respective first and second low-pass filters.

18. The apparatus of claim 11, wherein the first and second factors are (1-K) and K, respectively, wherein K is 0 to 1.

19. The apparatus of claim 10, wherein the pickup means includes:
    an X-ray tube for irradiating X-ray to an object;
    an image intensifier for receiving the X-ray through the object and converting the X-ray into light beam; and
    an image pickup tube for converting the light beam into the analog image signal.

* * * * *